Dec. 15, 1931.      J. A. PROCTOR      1,836,725
ELECTRICAL APPARATUS
Original Filed June 4, 1921
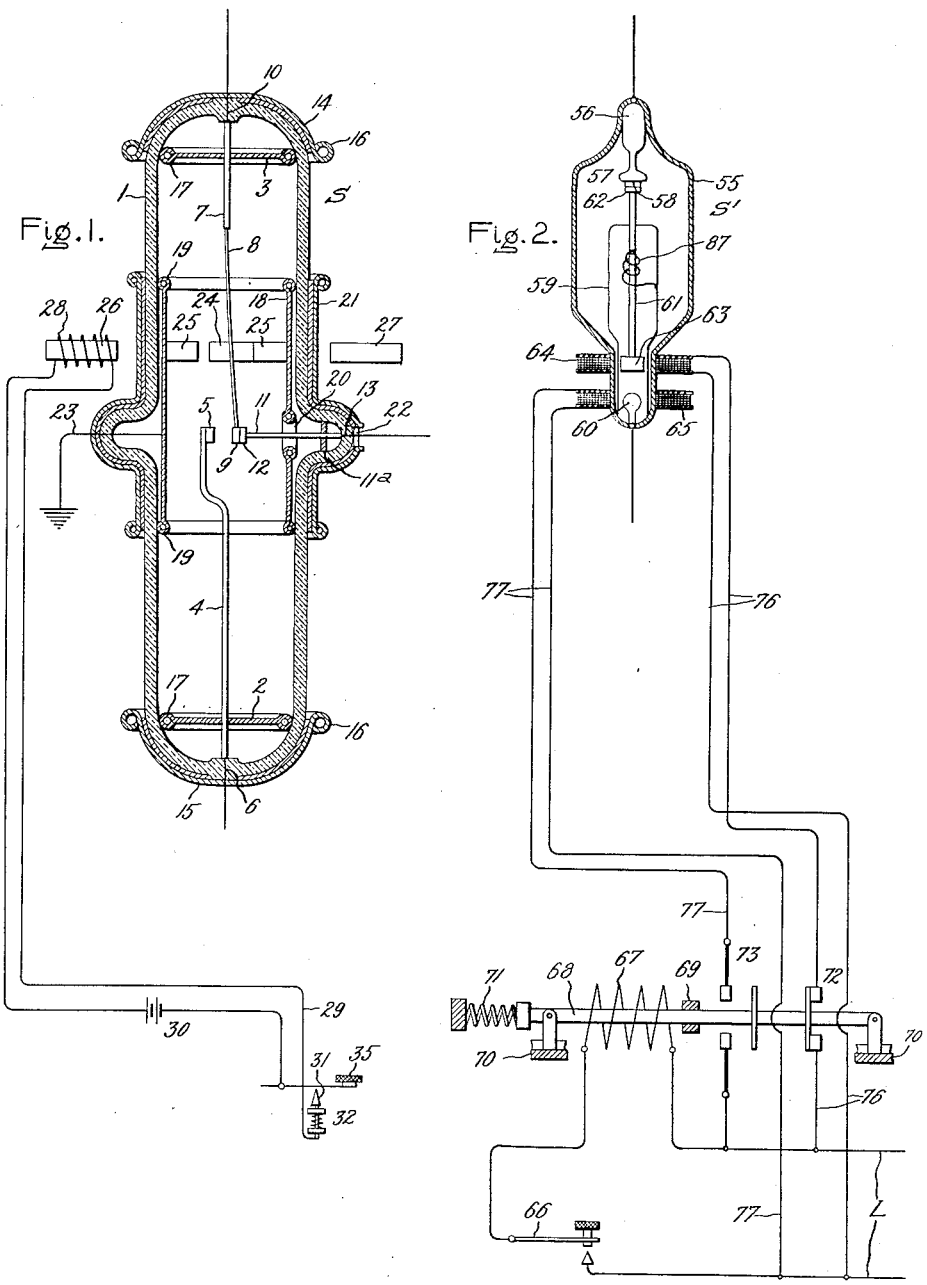
Inventor:
John A. Proctor
by Philip Farnsworth
His Attorney.

Patented Dec. 15, 1931

1,836,725

UNITED STATES PATENT OFFICE

JOHN A. PROCTOR, OF LEXINGTON, MASSACHUSETTS, ASSIGNOR, BY MESNE ASSIGNMENTS, TO GENERAL ELECTRIC COMPANY, A CORPORATION OF NEW YORK

ELECTRICAL APPARATUS

Original application filed June 4, 1921, Serial No. 475,144, now Patent No. 1,510,341, dated September 30, 1924. Divided and this application filed February 28, 1923. Serial No. 621,728.

This invention relates to switches for use in high potential work such as in radio transmitters and receivers and in power factor work.

This application is a division of Serial No. 475,144, filed June 4, 1921, issued as Patent No. 1,510,341, September 30, 1924. No suitable switch has been heretofore devised which is capable of withstanding, when open, the normal working voltage of a radio transmitter, say 50,000 volts, and at the same time to have the contacts close enough together so that they will work sufficiently quick and be sufficiently sensitive to open and close during the brief intervals between successive actuations of the transmitting key.

Also in power factor work, a reliable high voltage disconnecting switch has not been available for use in connection with static condenser installations.

In power factor work, an economical, reliable high voltage disconnecting switch has not been available for use in connection with static condenser installations.

The power factor of a high voltage system varies with the load on the system. It is, therefore, of great importance to be able to control the amount of condenser current placed across these lines in such a manner as to provide the best power factor for conditions of load on the system. In a power factor static condenser installation across a fairly low voltage line, the amount of correction may be varied by switching condensers on and off the line, using oil or other switches of standard design. However, if condensers are placed directly in the high potential line, the standard switching means now on the market is not suitable for use in continuously making and breaking circuits connected to them, due to the destructive arcing accompanying their operation. Oil switches of proportions ample to take care of the disconnection and re-connection of apparatus on high potential lines are too expensive to warrant their use for this work. Disconnecting switches, therefore, form an important element of the static condenser power factor system. Inasmuch as the hourly variation of power factor on a high voltage line is large, and therefore if economic correction is provided for the maximum lagging conditions, means must be provided for reducing this correction as the load is removed.

An important thing in the use of condensers for power factor work hinges about the ability to successfully and cheaply disconnect at will banks of high voltage condensers. Assume, for example, a high voltage line without load. The line would simply be carrying charging current or have a very low leading power factor. As the substations take off load, the power factor would increase and still be leading. Since substation loads are usually at a lagging power factor, the capacity reactance of the line is ultimately neutralized by the inductive reactance of the load. A point is usually reached within a range of 10% to 75% of the full output of the system when the power factor is approximately unity. As more load with lagging characteristic is added to the line, the whole system becomes lagging and the power factor drops. The power factor may be restored by adding a condenser at the consuming end. It will be appreciated that if this is done and the consumers cut off their load and leave the condenser connected to the line for light loads on the line, the power factor will be low and leading. The main objection to this is not that there will be high losses on low loads, but is primarily one of poor voltage regulation. If the condensers are cut out of circuit in steps as the load is varied, the power factor can be maintained at a high value over a considerable variation in load. The importance of correction control increases with the length and voltage of the line.

In the present invention, it is my plan to provide vacuum switches for replacing the high voltage oil and other forms of switches now in use. I provide relatively movable contacts which operate in a vacuum, the contacts being enclosed in a bulb from which air has been exhausted. Means is also provided to prevent the heating of the glass or other fusible material used in the construction of the apparatus due to the cutting of the glass by the electric lines of force developed at high potentials.

An object of the present invention is to provide constructions of the above type in which the losses are at a minimum.

In particular, the object of the invention is to provide a condenser or high voltage switch which will be comparatively cheap and economical to build and which is efficient and durable.

Another object of the invention is to provide a high voltage switch in which there will be very little loss or sparking when the switch is opened, whereby high voltage circuits can be quickly made and broken.

Another object of the invention is to so form the terminals of the switch that the electric field is parallel to the dielectric at all points.

This application is a continuation in part of my application Serial Number 441,628, filed February 1, 1921, issued as Patent No. 1,633,285, June 21, 1927.

In the accompanying drawings,

Figure 1 is a sectional elevation of one embodiment of the present invention illustrating vacuum switch having a double throw contact.

Fig. 2 is a sectional elevation of a modified form of vacuum switch having a single throw contact embodying the present invention.

Referring to Figure 1, there is illustrated a switch S having a casing or bulb 1 which may comprise any fusible dielectric material, such as high melting point glass, from the interior of which air may be exhausted. Secured at opposite ends within the casing 1 are metal disks or shields 2 and 3. A metal conducting rod 4 is supported by the disk 2 and terminates adjacent the enlarged central portion of casing 1 in a contact 5, the rod 4 being electrically connected to a wire conductor 6 sealed in the glass of the casing 1 in the manner herinafter described. Supported by the metal disk 3 at the opposite end of the casing 1 is a metal conducting rod 7 which terminates at its inner end in a flexible metal spring member 8 having a contact 9 at its free end adapted to engage with the contact 5. The rod 7 is conductively connected to a wire 10 sealed in the glass of the casing 1 as hereinafter described. Projecting inwardly towards the contacts 5 and 9 is a third conductive rod 11 supported within the casing 1 by means of a frame 11a and arranged at an angle to rods 4 and 7. The rod 11 terminates in a contact 12 between which and the contact 5 is interposed the contact 9, the contact 9 being adapted to alternately engage the contacts 5 and 12. The rod 11 is electrically connected to a wire 13 sealed in the glass casing 1 and extending therethrough. The contacts 5, 9 and 12 may comprise some high melting point metal and good conducting metal such as tungsten which will not melt under the high heat developed in the switch during service nor at such temperatures give off gases which would impair the vacuum.

In order to localize the electric fields both inside and outside of the casing 1 in high voltage service and to maintain such field parallel with the casing 1 at all points to prevent the cutting of the casing by the lines of force which would otherwise heat the casing, I use the two metal disks or shields 2 and 3 within the casing at opposite ends and which are electrically connected to the rods 4 and 7, as the rods may have a difference of potential of the order of 50,000 volts. Upon the outside of the casing 1 at opposite ends, I place metal caps or shields 14 and 15, which may serve as terminals and which are secured to the ends of the casing in any suitable manner and are flared out away from casing 1 and rolled at their edges 16 to prevent brushing and concentration of the electric field and space the edges of the caps from the casing. In like manner, the disks 2 and 3 are rolled up at their edges 17 to prevent concentration of the field. The caps 14 and 15 are electrically connected to the disks 2 and 3 through conductors 6 and 10, and are therefore at the same potential as the disks. Centrally arranged within the casing is a cylindrical metal shield 18 which has its opposite edges rolled at 19 and spaced from shields 2 and 3 for the purpose specified and is provided with a hole 20 through which the rod 11 extends and from which it is spaced. Arranged concentrically with the shield 18 upon the outside of the casing 1 is a metal shield 21 provided with an opening 22 through which the conductor or lead 13 passes and whereby it is insulated from the shield 21. The shields 18 and 21 are electrically connected together by a conductor 23 which is grounded and which is sealed in the glass 1 of the casing.

I also provide means for actuating the switch S herein disclosed so that the contact 9 alternately engages contacts 5 and 12. This means in the present embodiment of the invention as disclosed in Fig. 1 comprising a soft iron armature 24 secured to the flexible support 8 and movable between spaced soft iron pieces 25 secured to the shield 18 and providing a magnetic path. The contact 9 is actuated from a point exterior of the casing 1 by magnetic means such as the electromagnet 26, which is connected in a circuit containing a suitable source of energy as hereinafter described, and a permanent magnet or electromagnet 27 which tends normally to draw the contact 9 into engagement with the contact 12, the electromagnet 26 when energized opposing the magnet 27 and overcoming the force thereof to bring the contacts 5 and 9 together. The iron pieces 25 provide a magnetic path between the outside magnets and armature 24. As more fully described hereinafter, the air has been exhausted from within the casing 1 whereby the contacts 5, 9 and 12 operate in a vacuum in the manner hereinafter more fully described.

The form of switch disclosed in Fig. 1, is particularly adapted for use in connection with radio transmitting and receiving apparatus as fully described in my previously mentioned Patent 1,510,341. For this purpose, the specific embodiment of switch illustrated is especially adapted. The electromagnet 26 comprises a coil 28 and a circuit 29 having a battery 30 therein for energizing the magnet. This circuit 29 is completed by means of a contact 31, which is spring-mounted at 32, and engages with the usual key 35. When the key 35 is released, the permanent magnet 27 then automatically draws the contact 9 into engagement with contact 12. By operating the contacts 5, 9 and 12 in a vacuum the dielectric strength of the vacuum is such that the contacts 9 and 12 may be placed very close together and still be capable of withstanding without breakdown or the slightest leakage the high potentials impressed therebetween.

In order to prevent high losses in the glass of casing 1 due to the intense electric fields generated in the high voltage circuits of this character as disclosed in Fig. 1, the shields 2, 3 and 18 are located upon the inside of the casing 1 while the shields 14, 15 and 21 are located upon the outside of the casing. By utilizing the said shields, the electric fields that are set up in and around the switch S in high voltage service instead of cutting the casing 1 are substantially parallel therewith, extending between the disk 2 and the shield 18, on the one hand, and between the disk 3 and the shield 18, on the other hand, within the casing 1, and on the outside of the casing extending between the cap 14 and shield 21 and cap 15 and shield 21. By flaring out the edges of the shields 14 and 15 and shield 21 upon the outside of the casing, a path is provided between them outside of the casing for the electric field which is spaced from the glass. The glass casing 1 provides the proper leakage distance between the caps 14 and 15 of opposite potential located at opposite ends of the casing. The field within the casing 1 is strongly localized therein by means of the inner shields 2, 3 and 18 whereby the lines of force are prevented from cutting the glass casing. The field on the outside of the casing is localized and spaced from the casing between the caps 14 and 15 and shield 21. The shields 2, 3 and 18 within the casing are at the potential of shields 14, 15 and 21 respectively outside of the casing; hence no field exists across the casing between adjacent or opposing shields.

In order to position or place the metal parts of the present invention within the casing 1, during construction, one or both ends of the casing are left open so that the parts may be inserted. The intermediate leads 13 and 23 extending through the glass are then sealed in. The end or ends are then sealed up and the leads through the ends sealed in. A glass tube is left extending into the casing and at some accessible point, through which tube the high degree of exhaustion can be obtained. After exhaustion, the tube through which the exhaustion has taken place may be melted from casing 1 and sealed up.

The order of vacuum or exhaustion which exists in a switch of the above-described type should be extremely high, such that no appreciable gas ionization takes place to cause losses while the apparatus is in operation, which condition is obtained, for example, by a pressure of the order of a millionth of a millimeter of mercury. Such exhaustion may be obtained by any well-known means, such as a Gaede or molecular pump or Langmuir's condensation pump.

All materials inside the casings of such vacuum switches are to be suitably treated to remove gases (occluded or otherwise) according to any of the well-known processes in use for the production of high vacuum apparatus. Such treatment may consist, for example, in initially, before assembling in the casing, treating these materials to remove gas preliminarily, as by heat of the order of the melting point of the materials or by heat of a lower order for a longer period. One method of removing such occluded gases is to place the metal parts in an oven and heat them to a high temperature, of the order of 500°. to 1100° C., for a sufficient time to remove the gases. In addition, it is advisable, after assembling in the casing, which may be of high melting point glass, to subject the contained materials and casing to further treatment to remove any residual or occluded gases, while evacuation is taking place. This final treatment may consist of heating in an oven at the highest temperature the glass will stand,—say in the neighborhood of 500° C., evacuation taking place while being heated in the oven. The casing or bulb is then sealed off.

Another final treatment may be the well-known method of removing gases from metals by inserting the metallic portions and casing in a high frequency magnetic alternating field of a suitable intensity during exhaustion. In this final treatment, the entire device, while undergoing exhaustion, may be placed within the field of a coil-carrying high-frequency current. This heats the metal parts, inside the casing, thereby driving off and removing gases before the device is completely exhausted, and then sealed off.

The materials used in the vacuum switches herein described should be of such a nature that the gases may easily be removed by the above-described processes. Therefore, in constructing them, nickel, tungsten, molybdenum, pure iron, preferably plated with cobalt, or rolled steel should be used wherever possible in constructing all parts.

The conductors 6, 10, 13 and 23 may be of platinum if so desired, especially when casing 1 is of glass, on account of the similar co-efficients of expansion of glass and platinum, and, in any instance, any well-known seal, such as used with high vacuum devices such as X-ray tubes, thermionic devices, and the like, may be used for bringing the conductors out and maintaining the high vacuum necessary in the present invention.

Referring to Fig. 2, I have illustrated a modified form of vacuum switch S' which is described and specifically claimed in my divisional application Serial No. 259,880, filed March 7, 1928. This switch comprises a casing 55 of insulating material having within the same at one end a metal support 56, terminating in a spring or cushion 57 having a contact 58 thereon. Mounted in the opposite end of the casing 55 is a metal support or guide 59 having at its lower end a spring buffer or cushion 60. Slidably mounted within the guide 59 and between the cushions 57 and 60 is a rod 61 having at its inner end a contact 62 co-operating with contact 58. At the opposite end of rod 61 is a soft iron armature 63 whereby the rod 61 and its contact 62 may be actuated in the manner hereinafter described. The parts within the casing 55 may be assembled, treated and evacuated in the manner above-described in connection with Fig. 1, and the operation of the break or relay is substantially like that disclosed in Fig. 1, although in this embodiment the number of contacts have been reduced and spring means have been provided for taking up the shock of impact of the relatively moving contacts. These contacts, which may be of silver or similar good conducting metal, like the contacts of Fig. 1, operate in a vacuum whereby their separation and contact may be rapid and quick while maintaining high insulation resistance between them when opened by reason of the high dielectric properties of the vacuum. Surrounding the end of the tube 55 having movable armature 63 are a pair of solenoids or electromagnets 64 and 65, adapted when energized to alternately close the contacts 58 and 62 and separate them. These switches are of general application and are especially adapted for use in power factor work. In the illustration of Fig. 2, the switch S' is so arranged that it may be remotely controlled. For this purpose, I have illustrated the control key 66 in series with the line L, which, when it is depressed, energizes a solenoid 67, which in turn actuates a multiple switching device or rod 68 by reason of its attraction for a soft metal core 69 secured to the rod 68.

The rod 68 is slidably mounted in suitable guides 70, and is constrained to move in one direction by means of a spring 71, the solenoid 67 actuating rod 68 in the opposite direction upon the depression of the key 66, the spring actuating the rod upon the release of the key 66. The rod 68 controls the switches 72, 73. When the key 66 is depressed to close the circuit L, the switch 72 is opened, and then the switch 73 is closed. In the position illustrated in the drawings, the switch 72 is closed, the other switch being open, thereby energizing the solenoid 64 which is connected to the line by lead 76 through switch 72. Upon the depression of key 66, switch 72 opens, de-energizing the solenoid 64, and then yielding switch 73 closes, energizing the solenoid 65 connected to the line through conductor 77 to rapidly open the contacts 58 and 62 by the attraction of the solenoid 65 for the armature 63. The contacts 58 and 62, although close together when open, are sufficiently insulated by the vacuum dielectric to prevent sparking or brushing. On the other hand, these contacts 58 and 62 are closed whenever the key 66 is released. The form of switches disclosed in Figs. 1 and 2 are characterized by rapidity of opening in a vacuum and are especially advantageous for use in handling high potentials. The shields disclosed in Fig. 1 may be incorporated in the break switch disclosed in Fig. 2.

The construction and method of assembly of the vacuum switch S' of Fig. 2 may be accomplished just like that described in connection with Fig. 1, and the materials should be such as above enumerated. In Fig. 2, one of the solenoids for actuating the contact 62 may be replaced by any equivalent means such as a spring. As illustrated, the impact of the contact 62 is taken up and resisted by the springs 57 and 60 whereby jar upon the casing is eliminated. The wire lead from the contact 58 through the casing is sealed in as above described while the contact 62 is electrically connected through the guide 59 and loose conductor 87 and a wire lead sealed in the casing and connected to such guide.

The casings or bulbs herein referred to and claimed may comprise insulating material wholly or in part, in order properly to insulate the leads and should also comprise material such that a vacuum may be maintained in a casing composed of it.

The constructions of vacuum switches above described provide compact, cheap, efficient means for controlling the high potentials in circuits where they are used. These vacuum switches are highly sensitive and with very slight separation of contacts maintain the circuits electrically open, notwithstanding the high potentials existing in their neighborhood. Furthermore, the cases are amply protected by the static shields employed.

It is to be understood that the invention is not limited to the embodiments and features specifically shown and described herein, but that such embodiments and features are subject to changes and modifications without any departure from the spirit of the invention.

I claim:—

1. In a switch, a casing of insulating material, relatively movable contacts mounted within the casing, leads from said contacts extending through the casing, means for making and breaking the circuit at said contacts; and shields associated with said leads and casing to prevent the heating of and losses in the casing by the electric field.

2. In a high duty dielectric switch, a casing having an enlarged central portion from which air has been exhausted forming a vacuum and provided with conductors sealed in the opposite ends of said casing and terminating adjacent the enlarged central portion thereof, a pair of relatively movable high melting point contacts mounted upon the ends of said conductors within said casing in the vacuum, said contacts being substantially free of residual or occluded gases whereby the formation of gases within the casing by heating of the contacts by the current is prevented and the vacuum is maintained, and protective shields associated with the sealed in portions of said conductors.

3. In a switch, an air tight casing from which air has been exhausted, cooperating circuit controlling contacts within said casing one being movable, a member of magnetic material secured to said movable contact, a second member of magnetic material mounted within the casing in spaced relation with the first member and means outside of the casing for magnetizing said magnetic member to operate said movable contact.

4. A high tension switch comprising a casing of insulating material, relatively movable contacts arranged therein intermediate the walls thereof; leads for said contacts extending thru the interior of the casing to and thru the walls thereof at widely separated points; metal static shields located inside the casing in the vicinity of the points of passage of said leads thru the casing walls; and metal static shields located outside the casing in the vicinity of the interior shields; the neighboring interior and exterior shields being electrically connected with the adjacent contact lead and reducing cutting of the casing wall by high tension lines of force.

5. The improvement substantially as specified in claim 4 but further characterized by the fact that the casing is oblong and the two pairs of shields are located respectively at the end of the casing, providing a wide spacing between the opposite terminals of high potential difference.

6. The improvement substantially as specified in claim 4 but further characterized by the fact that the exterior shields are spaced from the casing, thereby localizing the exterior field away from the casing.

7. A high vacuum switch comprising an air-tight casing having an enlarged central portion and provided with conductors sealed in the opposed ends of said casing and terminating adjacent the enlarged central portion thereof, relatively movable contacts mounted upon the free ends of said conductors for separation within said casing, said contacts being substantially free of residual or occluded gases and the said casing exhausted to such a high degree of vacuum that no appreciable gas ionization takes place while the switch is in operation whereby the switch may control a high potential circuit with a relatively small separation of the contacts, means for opening and closing said contacts, and protective shields associated with the sealed in portions of said conductors.

8. A high vacuum switch comprising an air-tight casing having an enlarged central portion and provided with conductors sealed in the opposite ends of said casing and terminating adjacent the enlarged central portion thereof, means including a tungsten contact mounted on the free end of one of said conductors and a cooperating contact mounted on the free end of the other conductor for making and breaking a circuit within said casing, said contact means having been treated to remove residual or occluded gases therein and the said casing exhausted to such a degree that no appreciable gas ionization takes place during operation of the switch means for operating said contact means to engage and disengage the contacts, and protective shields associated with the sealed in portions of said conductors.

9. A high potential, high vacuum switch, comprising an air-tight casing having an enlarged central portion and provided with conductors sealed in the opposite ends of said casing and terminating adjacent the enlarged central portion thereof, a pair of relatively movable contacts mounted on the free ends of said conductors to be separated within said casing, said contacts and all parts and surfaces within the casing having been treated to remove residual or occluded gases and said casing exhausted to provide a vacuum of the order of one millionth of a millimeter, whereby the formation of gases within the casing is prevented and vacuum is maintained during operation of the switch, and protective shields associated with the sealed in portions of said conductors.

JOHN A. PROCTOR.